United States Patent [19]

Brown et al.

[11] 4,262,563

[45] Apr. 21, 1981

[54] TURRET INDEXING ASSEMBLY FOR MACHINE TOOLS

[75] Inventors: Ivan R. Brown, Horseheads; Garnet R. Lyon, Elmira, both of N.Y.

[73] Assignee: Hardinge Brothers, Inc., Elmira, N.Y.

[21] Appl. No.: 912,448

[22] Filed: Jun. 5, 1978

[51] Int. Cl.³ ............................................. B23B 29/32
[52] U.S. Cl. .................................... 82/36 A; 74/821; 74/826
[58] Field of Search ............. 82/36 A; 74/813 L, 814, 74/815, 821, 826

[56] References Cited

U.S. PATENT DOCUMENTS

| | | | |
|---|---|---|---|
| 2,883,886 | 4/1959 | Benjamin | 74/821 |
| 3,446,096 | 5/1969 | Kostur | 74/821 |
| 3,464,292 | 9/1969 | Parsons et al. | 74/826 |
| 3,552,242 | 1/1971 | Morgan, Jr. et al. | 74/826 |

Primary Examiner—Leonidas Vlachos
Attorney, Agent, or Firm—Shlesinger, Arkwright, Garvey and Dinsmore

[57] ABSTRACT

A turret index assembly has an air piston connected to a pawl to provide a cushioned stop therefor after its engagement with one of the teeth of a machine tool turret index plate.

8 Claims, 4 Drawing Figures

TURRET INDEXING ASSEMBLY FOR MACHINE TOOLS

BACKGROUND OF INVENTION

This invention relates to turret indexing assemblies, and particularly to apparatus for providing improved indexing of a turret.

Machine tools having indexible turrets have become progressively more sophisticated, particularly with respect to automatic positioning of the several tools on their turrets.

These controls for changing position of the turret are used in automatic sequencing of tool operations to different tool stations. With the requirement for high accuracy, and the increasing size and complexity of the various tools at each station, the problem of accurate alignment with each change of position of the turret has been magnified.

The increasing size and weight of the tools and greater alignment accuracy requirements have limited rapid indexing of the turret from station to station.

ADVANTAGES AND FEATURES OF THE INVENTION

Accordingly, it is a principal feature of this invention to provide an improved turret indexing assembly.

Another feature is the simplification of the turret indexing assembly.

A still further feature is the elimination of shock and impact in an indexing assembly.

A further feature is the use of a double positioning arrangement for providing very accurate indexing of the turret.

A yet further feature is the use of a special pawl assembly for providing a cushioned stop of the turret after it engagement with the turret indexing plate.

A still further feature is the provision of a simplified method of spinning the index plate which is quick acting, and for a two-stage stop and alignment assembly for the turret.

Figure 1:
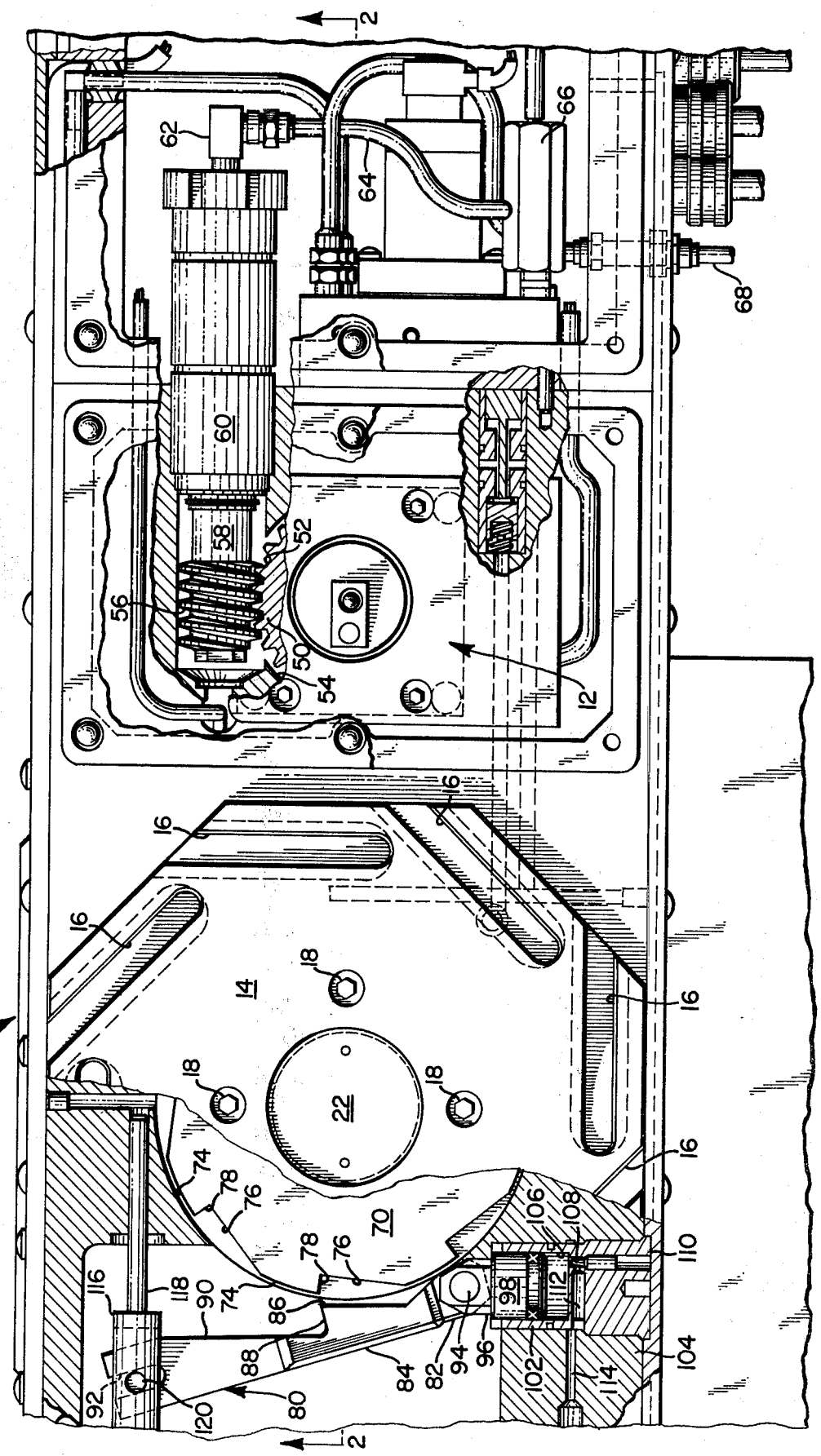
FIG. 1 is the top view of a machine tool carriage partially cut away to show the turret indexing plate and pawl assembly.
Figure 2:
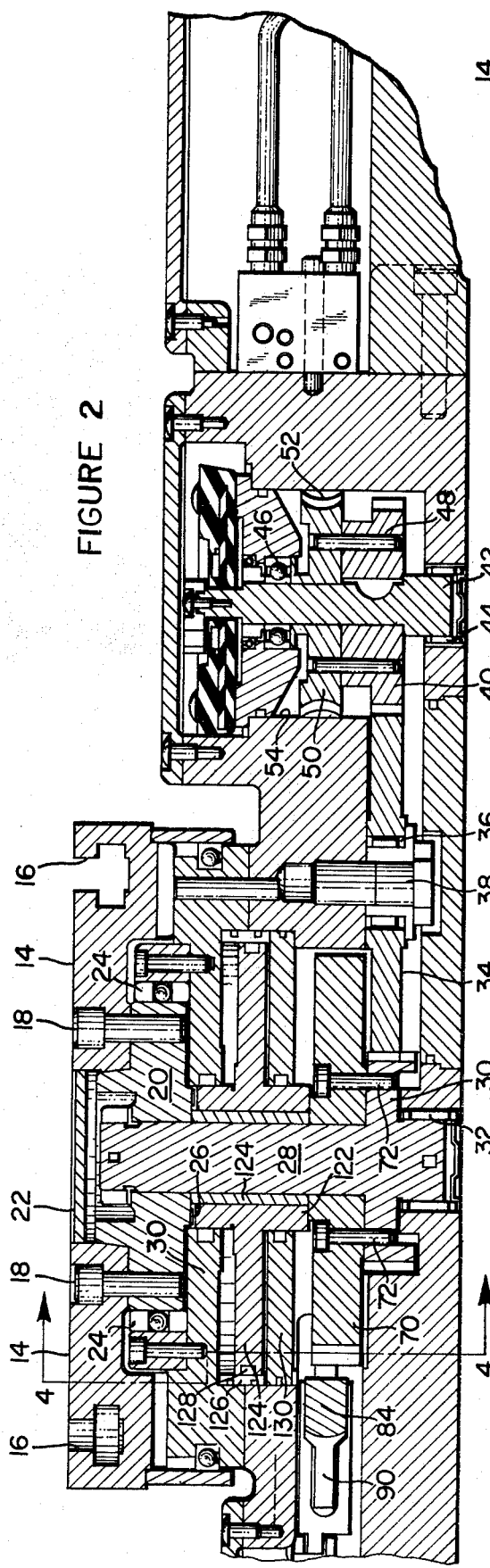
FIG. 2 is a section of FIG. 1.

Referring particularly to FIGS. 1 and 2, the turret and index assembly generally indicated at 10 occupies one part of the tool carriage which is mounted on a base, while the encoder control assembly generally indicated at 12 occupies the other part of of the tool carriage. The upper turret member 14 is rotatable and has at its upper surface tool receiving slots 16. Bolts 18 in the upper turret member 14 hold it integral with the turret spindle engaging member 20. Cover 22 is disposed flush with the upper surface of the turret 14. The turret spindle engaging member is supported by bearings 24 adjacent its outer periphery and at 26 along its lower surface immediately adjacent the vertically disposed turret spindle 28. The lower portion of the turret spindle 28 has a small spur gear 30 disposed immediately above a lower support bearing 32. The spur gear 30 engages a larger idler gear 34 which is mounted on a bearing 36 and a vertical spindle 38. A drive gear 40, the size of spur gear 30 (FIG. 2) is mounted on a vertical spindle and encoder shaft 42, the latter being supported at its lower extremity by the bearing 24 and its upper supported section by the bearing 46. Drive gear 40 is connected by several pins 48 to pinion 50 having curved teeth 52 and is mounted in the circular cavity 54 of the encoder housing. The teeth 54 of pinion 50 mesh with the worm gear 56 mounted on the end of shaft 58 of air motor 60.

An air line fitting 62 connects the air motor 60 to the air supply line 64 at one end, and its other end connects to the common fitting 66. This fitting 66 is in turn connected by line 68 to the external air supply.

Figure 3:
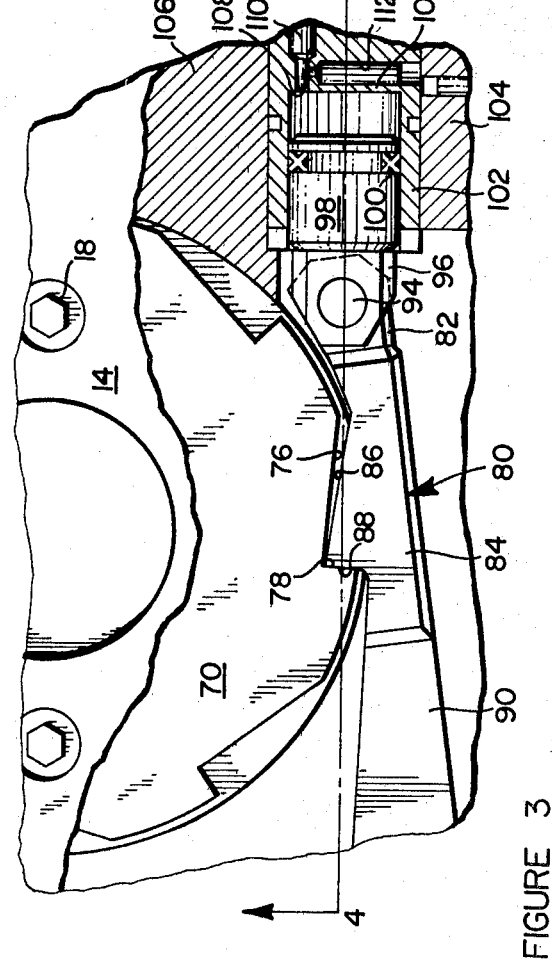
FIG. 3 is an enlarged view of the turret index plate and pawl.

Referring particularly to FIGS. 1 and 3, the index wheel 60 is connected by bolts 72 to the spindle gear 30. It has a periphery 74 having cut out sections 76 with multiple stop faces 78 corresponding to the location of the tool slots 16 of the turret.

The pawl arm 80 provides a stop for the index plate. It has a pivoted end piece 82, and a central stop face engaging section 84. This section 84 has an outwardly extending engaging element 86 which has a flat stop face engaging surface 88 at its other end. The pawl 80 has an end activating section 90 with a bifurcated pin engaging section 92.

The pawl is pivotally supported by the pivot pin 94, which extends through the opening of the pawl end piece 82 and the openings of the bifurcated pawl engaging section 96 of the air cushioning piston 98. The cushioning piston 98 has a quad seal 100 and is disposed within the cylinder 102 of the housing 104. A small internal space 106 which allows for small movement of the cylinder, is provided immediately above an air bleed orifice 108 and a needle valve element 110. Air exhaust and supply passages 112 and 114 permit flow of air to and from the cylinder 102.

These air passages extend through the housing 104 which also supports the piston and provides a periphery within which the index plate 70 is housed. The pawl 80 at its outer end section 90 is moved laterally by the air piston valve shaft member 116 and the air piston extension 118. The air shaft member 116 has a pin 120 which extends up between the two arms of the bifurcated section 92 of pawl 80. The slender air piston extension 118 extends into its cylindrical passage to provide support for the end of the shaft. It also acts to control air flow through the passageway 119.

Figure 4:
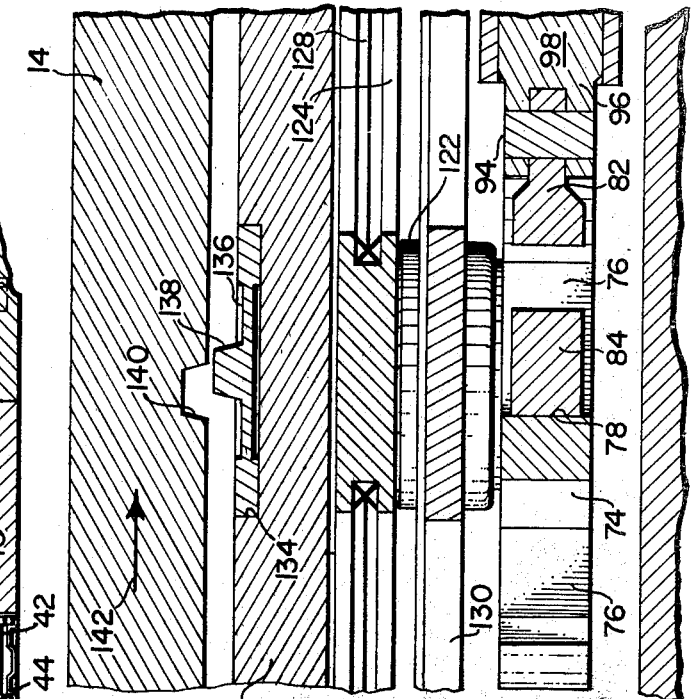
FIG. 4 is a section of the turret and indexing assembly taken along line 4—4 of FIG. 2.

Referring back to the turret spindle 28 which is integrally connected to the turret, it will be seen that there is provision for its vertical movement. A collar 122 supports a vertically movable circular flat piston 124, which has a cylindrical bearing 126 adjacent its outer peripheral seal 128. Circular piston 124 moves between the lower plate 130 and an upper plate 132 as can be seen in FIGS. 2 and 4. The upper plate 132 has plural spaced cutout recessed sections 134 adjacent its periphery for each tool station within which a special turret engaging plate member 36 having a vertically disposed tooth 138 is situated. This tooth engages the recess 140 disposed in the lower surface of the turret 14 for a given tool station recess 16. For more specific description of this turret engaging plate assembly, see U.S. Pat. No. 3,464,292, issued to Parsons et al.

OPERATION

The turret 14 is moved on activation of the air motor 60 and release of the index plate 70 from the lock action of the tooth 138 and the pawl 80. The turret is moved any desired member of stations before being brought to rest. Its movement is controlled by the encoder assembly 12, a part of which is mounted on the drive gear spindle shaft 42.

Rapid movement is brought about by the activation of the air motor and the rather simplified gearing using the worm gear 56 to turn the drive gear 40 which then moves the spur gear 30 of the turret assembly through idler gear 34.

However, before this movement two releases must be made. First, the previously locked turret 14, resting on tooth 138 (FIG. 4) must be lifted by the circular piston 124. It should be noted that when fluid is introduced between the lower plate 130 and the piston, it will raise from the position shown in FIG. 2 to the free raised position shown in FIG. 4 to permit rotational movement as indicated by the arrow 142. The spindle engaging member 20 which supports the turret 14 rotates on the bearing 26 at the top of the hub 122 of the lifting piston 124. Peripheral rotational support is given by the bearing at 24. The length of the teeth of spur gear 30 are of sufficient length so that when the turret spindle 28 is raised with the turret assembly, the teeth of idler gear 34 will not disengage.

Secondly, the pawl 80 must be moved clear of index plate 70. The index plate 70 is integrally connected to the turret spindle 28, and moves upwardly as well as rotating with the turret assembly. The pawl 80 is released from the index plate by retraction of the air control valve shaft member 116 and its engagement with the pawl 80 by its pin 120. This retraction movement pivots the pawl about the pivot pin 94, moving the flat face 88 of the outwardly extending engaging section 86 away from the stop face 78 of the index plate 70 to which it had been engaged. This will permit the turret 14 to rotate on its spindle 28.

The turret will rotate through the desired number of tool stations 16 (tools not shown), and at the station to which it is to be stopped the pawl will be pivoted toward the index plate prior to the arrival of, and into the path of, the corresponding flat face 78.

It will be noted, as shown in FIG. 3, when engagement is made, the faces 78 and 88 are in direct alignment with the pin 94 and the piston 98. The index plate will move the pawl 80 and the piston 98 toward the right. It will be noted that the air in the cylinder between the piston 98 and the inner wall 106 will compress and simultaneously escape from the chamber through the orifice 108 at a controlled rate. This small movement, with positive gradually increasing restraining force, will preclude the shock of sudden impact of the moving turret against a fixed immovable object.

Referring to FIG. 4, it can be seen that as the turret moves in the direction of the arrow 142 its under surface will come to rest with its corresponding slot 140 in direct alignment with the tooth 138 of the turret engaging assembly 136.

It should be noted that as this takes place, the stem 118 (FIG. 1) closes off the air passage 119 which brings about shut-down of the air motor 60 as well as release of the air supply holding the circular piston 124 in its upward position. With the shut down of the air motor and the release of the air holding up the raising piston 124, the turret 14 will come to rest downwardly on the support plate 132 and its slot 140 will directly engage the tooth 138 for direct and accurate alignment. It should be noted that the tooth 138 also has a spring-like web section on which it is supported which allows for some vertical deflection and exact fitting.

It thus can be seen that we have a two-stage stop indexing assembly for the turret which provides shockless stopping with a piston mounted pawl, and extremely accurate positioning with a resiliently mounted tooth and slot structure for final positioning of the turret. These slots or recesses 14 are very accurately machined, and the vertical engaging arrangement of the slot 140 and the positioning tooth 138 preclude loss of accuracy due to relative movement of the parts because of lateral impact shock, or deforming of the engaging surfaces due to such impact.

This is made possible by the piston mounted shockless pawl assembly which, through the index plate, takes the lateral load imposed by the rotational movement of the turret. The air cylinder and bleed arrangement permit rapid deceleration of the turret to the final stop position to a point where the tooth 138 and the turret slot 140 are in direct alignment, ready for vertical movement of the spindle 14 downward onto the tooth when the lifting piston 124 is lowered.

Thus it can be seen that impact due to sudden stop of the turret is eliminated, and accurate alignment of the tools of each station with the work results when the tooth 138 and machined slot 140 come into engagement.

It also should be noted that the air motor makes possible the use of simplified gearing to turn the vertical turret spindle shaft 28, eliminating complex gear trains previously required.

The pawl piston movement is controlled by the needle valve element 110 mounted directly below the air orifice 108 so that movement of the piston 98 toward the cylinder end wall can be controlled very accurately.

The interrelationship of the various operations through physical connection is also of interest in that elaborate sensing and control functions are eliminated. This is brought about by positioning of the various interacting elements of the pawl movement control assembly 118, the length and travel of piston 98 with respect to the slot 140 and tooth 138, the clearances of the various elements with respect to the vertical movement of the lifting piston 124 and movement of the encoder control assembly 12.

The disclosed turret indexing arrangement permits the turret to be rotated at a faster rate than before, since the sudden impact of an immovable stop at a given station is avoided. The lack of impact and shock is of significance also, because the tools currently mounted on the turrets are more complex and finely set and impact could affect their setting and alignment with the workpiece.

The air cushion on the stop pawl for the index plate of the turret allows the turret to be rotated a full speed to just short of the stop position. The cushioned stop, because of the air cylinder takes all of the impact force and brings the turret to a gentle rapid stop in correct position for final precision alignment through the slot and tooth elements.

The significance of these developments can be appreciated when it is recognized that this assembly makes possible both quicker indexing and repeated stopping and positioning of the tools consistently to within several millionths of an inch. This type of accuracy was previously impossible.

While this invention has been described, it will be understood that it is capable of further modification, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. A turret assembly for a machine tool, comprising:
   (a) a turret rotatably mounted on a base and which has multiple work stations,
   (b) turret rotating means mounted on the base and connected to the turret for rotating the turret so as to move the work stations from one operating position to another,
   (c) cushioned turret stopping means mounted on the base and movable into engagement with the turret for gently stopping rotation of the turret after it has been rotated so as to bring a given work station to an operating position,
   (d) alignment means having elements on both the turret and the base for very accurately positioning the turret work station after it has been brought into operating position by the turret stopping means,
   (e) the turret stopping means including a plurality of angularly spaced large radially extending stop faces one for each work station and which are integrally connected to the turret,
   (f) the turret stopping means also including a fluid cylinder and pawl assembly mounted on the base in which a pawl has one end directly and pivotally connected to an element of the fluid cushioning cylinder for movement therewith.
   (g) the axis of the fluid cylinder being generally disposed in a direction tangential to the rotative path of the radially disposed stop surfaces,
   (h) the pawl having a large central flat stop face engaging surface which is moved into and out of the path of rotation of the plural stop faces as they rotate with the turret to engage one of the stop faces, and
   (i) activating means connected to the pawl adjacent the free end for moving its flat face into and out of engagement with a given one of the stop faces and generally in line with the axis of the fluid cylinder axis.

2. The turret assembly for a machine tool as set forth in claim 1, wherein:
   (a) the means for rotating the turret is an air motor which is mechanically connected to the turret.

3. The turret assembly for a machine tool as set forth in claim 1, wherein:
   (a) a worm gear and spur gear assembly connects the air motor to the turret.

4. The turret assembly for a machine tool as set forth in claim 1, wherein:
   (a) the means for stopping rotation of the turret includes a vertically movable index plate and a pawl assembly, and
   (b) the pawl assembly includes a pawl member which is pivotally supported on the fluid cylinder piston.

5. The turret assembly for a machine tool as set forth in claim 1, wherein:
   (a) the machine tool turret is connected to vertical lifting means for lifting the elements of the alignment means clear of each other to permit rotation
   (b) the means for rotating the turret is an air motor
   (c) the turret stopping means for stopping rotational movement of the turret at a selected work station includes an index plate and a pawl assembly, and
   (d) the activating means for engaging the pawl with the index plate is mechanically associated with an air supply to the air motor.

6. A turret assembly for machine tool, comprising:
   (a) a turret rotatably mounted on a base,
   (b) an indexing plate having a plurality of angularly spaced radially disposed flat stop faces and which is integrally connected to the turret and is rotatable therewith,
   (c) a pivotable pawl having a large flat stop face engaging surface at its midsection which is movable into direct engagement with the flat stop faces of the index plate,
   (d) fluid cylinder cushioning means having its axis tengentially disposed to the indexing plate and to an element of which one end of the pawl is pivotally supported, and
   (e) activating means connected adjacent the other end of the pawl for moving the pawl flat surface into and out of the rotative path of the stop faces of the index plate.

7. The turret assembly for the machine tool as set forth in claim 6, wherein:
   (a) the pivotable pawl is directly pivoted to the piston of the fluid cylinder by a large pivot pin.

8. The turret assembly for the machine tool as set forth in claim 6, wherein:
   (a) the fluid cylinder includes an adjustable fluid bleed-off valve for adjusting cushioning action of the cylinder.

* * * * *